US012769083B2

(12) United States Patent
Tomita

(10) Patent No.: US 12,769,083 B2
(45) Date of Patent: Oct. 20, 2026

(54) LENS UNIT HAVING LENS BARREL, RING PART, AND COATING FILM

(71) Applicant: Nippon Electric Glass Co., Ltd., Otsu (JP)

(72) Inventor: Mitsuru Tomita, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 238 days.

(21) Appl. No.: 18/683,072

(22) PCT Filed: Aug. 1, 2022

(86) PCT No.: PCT/JP2022/029461
§ 371 (c)(1),
(2) Date: Feb. 12, 2024

(87) PCT Pub. No.: WO2023/032550
PCT Pub. Date: Mar. 9, 2023

(65) Prior Publication Data

US 2025/0138271 A1 May 1, 2025

(30) Foreign Application Priority Data

Aug. 31, 2021 (JP) ................................ 2021-141644

(51) Int. Cl.
*G02B 1/113* (2015.01)
*G02B 3/00* (2006.01)
(Continued)

(52) U.S. Cl.
CPC .............. *G02B 7/026* (2013.01); *G02B 1/113* (2013.01); *G02B 7/021* (2013.01);
(Continued)

(58) Field of Classification Search
CPC . G02B 1/113; G02B 3/00; G02B 7/02; G02B 7/021; G02B 7/026; G02B 13/0045;
(Continued)

(56) References Cited

U.S. PATENT DOCUMENTS

2007/0076309 A1 4/2007 Shimizu et al.
2011/0299180 A1 12/2011 Yen
(Continued)

FOREIGN PATENT DOCUMENTS

JP 2002-131509 A 5/2002
JP 2007-094241 A 4/2007
(Continued)

OTHER PUBLICATIONS

International Search Report and Written Opinion with English translation thereof for PCT/JP2022/029461 mailed Oct. 11, 2022.

*Primary Examiner* — Ryan S Dunning
(74) *Attorney, Agent, or Firm* — Harness, Dickey & Pierce, P.L.C.

(57) ABSTRACT

Provided is a lens unit that is for an infrared region and that allows occurrence of a tilt error to be easily suppressed. A lens unit (4) is a lens unit which is used for an infrared region that includes at least any one of wavelengths in a range of 7 µm to 14 µm, and includes: at least one lens (1, 2, 3) that has a surface on which a coating film is formed; a lens barrel (6) that has a hole (61, 62, 63) in which the at least one lens is fitted; a ring part (65, 66, 67) that is a member which is in contact with a circumferential edge part (1*c*, 2*c*, 3*c*) of the at least one lens and which is for causing the at least one lens fitted in the hole to be located at a given position on an optical axis of the lens barrel (6) or fixing, at a given position on the optical axis of the lens barrel, the at least one lens fitted in the hole. The circumferential edge part of the at least one lens has, on a portion which is in contact with at least
(Continued)

any one of the lens barrel and the ring part, a region in which the coating film is not attached.

12 Claims, 4 Drawing Sheets

(51) Int. Cl.

| | |
|---|---|
| ***G02B 7/02*** | (2021.01) |
| ***G02B 13/00*** | (2006.01) |
| ***G02B 13/14*** | (2006.01) |
| ***G03B 15/00*** | (2021.01) |
| ***G03B 17/12*** | (2021.01) |

(52) U.S. Cl.
CPC ..... *G02B 13/0045* (2013.01); *G02B 13/0065* (2013.01); *G02B 13/008* (2013.01); *G03B 17/12* (2013.01); *G02B 13/14* (2013.01)

(58) Field of Classification Search
CPC .. G02B 13/0065; G02B 13/008; G02B 13/14; G03B 15/00; G03B 17/12
See application file for complete search history.

(56) References Cited

U.S. PATENT DOCUMENTS

| | | | | |
|---|---|---|---|---|
| 2015/0043001 | A1 | 2/2015 | Ishimaru | |
| 2017/0192132 | A1* | 7/2017 | Takahashi | C03C 3/321 |
| 2018/0180780 | A1* | 6/2018 | Komori | C03C 3/321 |
| 2019/0025576 | A1* | 1/2019 | Ho | G02B 27/0068 |
| 2020/0116977 | A1 | 4/2020 | Kajiyama et al. | |
| 2021/0048656 | A1 | 2/2021 | Wilson | |
| 2024/0377621 | A1 | 11/2024 | Tomita | |

FOREIGN PATENT DOCUMENTS

| | | | |
|---|---|---|---|
| JP | 2008-304642 | A | 12/2008 |
| JP | 5637488 | B2 | 12/2014 |
| JP | 2017-138563 | A | 8/2017 |
| JP | 2017-219745 | A | 12/2017 |
| JP | 2018-105905 | A | 7/2018 |
| JP | 2020-064165 | A | 4/2020 |
| JP | 2021-56271 | A | 4/2021 |
| JP | 2023-035048 | A | 3/2023 |

* cited by examiner

LENS UNIT HAVING LENS BARREL, RING PART, AND COATING FILM

TECHNICAL FIELD

The present invention relates to a lens unit that is used for a spectral characteristic measurement device and the like.

BACKGROUND ART

Patent Literature 1 discloses a near-infrared spectral characteristic measurement device which includes an objective lens that collimates signal light from a specimen, a phase shifter that is provided in collimated light, and an imaging lens that causes an image of the specimen to be formed in a detecting section. Patent Literature 2 discloses an imaging system which includes an optical system (objective lens) that collimates light from an object, a plurality of imaging lenses that each cause an image to be formed in a detecting section with use of a part of collimated light, and filters that are provided to the respective plurality of imaging lenses. Patent Literature 2 also describes design of an objective lens for the visible region.

CITATION LIST

Patent Literature

Patent Literature 1

Japanese Patent No. 5637488

Patent Literature 2

Japanese Patent Application Publication Tokukai No. 2020-064165

SUMMARY OF INVENTION

Technical Problem

Incidentally, there is known absorption of an infrared region (for example, wavelengths of 7 μm to 14 μm) on a long wavelength side of the near-infrared region, which absorption is caused by a molecular vibration inherent in a substance. Under the circumstances, for further development of spectral measurement techniques, spectral characteristic measurement devices, such as a hyperspectral camera, are expected to be expanded to such an infrared region. However, a lens unit of a finite-type spectral characteristic measurement device from which a measurement target is located at a short distance has a problem that a deviation of an angle of mounting of a lens with respect to a lens barrel member (tilt error) tends to greatly affects optical properties, as compared with a lens unit of an infinite-type spectral characteristic measurement device from which a subject is located at a long distance.

In view of the above problem, the object of the present invention is to provide a lens unit that is for an infrared region and that allows occurrence of a tilt error to be easily suppressed.

Solution to Problem

In order to attain the above object, a lens unit in accordance with an aspect of the present invention is a lens unit which is used for an infrared region that includes at least any one of wavelengths in a range of 7 μm to 14 μm, the lens unit including: at least one lens that has a surface on which a coating film is formed; a lens barrel that has a hole in which the at least one lens is fitted; and a ring part that is a member which is in contact with a circumferential edge part of the at least one lens and which is for causing the at least one lens fitted in the hole to be located at a given position on an optical axis of the lens barrel or fixing, at a given position on the optical axis of the lens barrel, the at least one lens fitted in the hole, wherein the circumferential edge part of the at least one lens has, on a portion which is in contact with at least any one of the lens barrel and the ring part, a region in which the coating film is not attached.

Advantageous Effects of Invention

A lens unit in accordance with an aspect of the present invention allows occurrence of a tilt error to be easily suppressed.

DESCRIPTION OF EMBODIMENTS

Embodiments

Optical System

Figure 1:
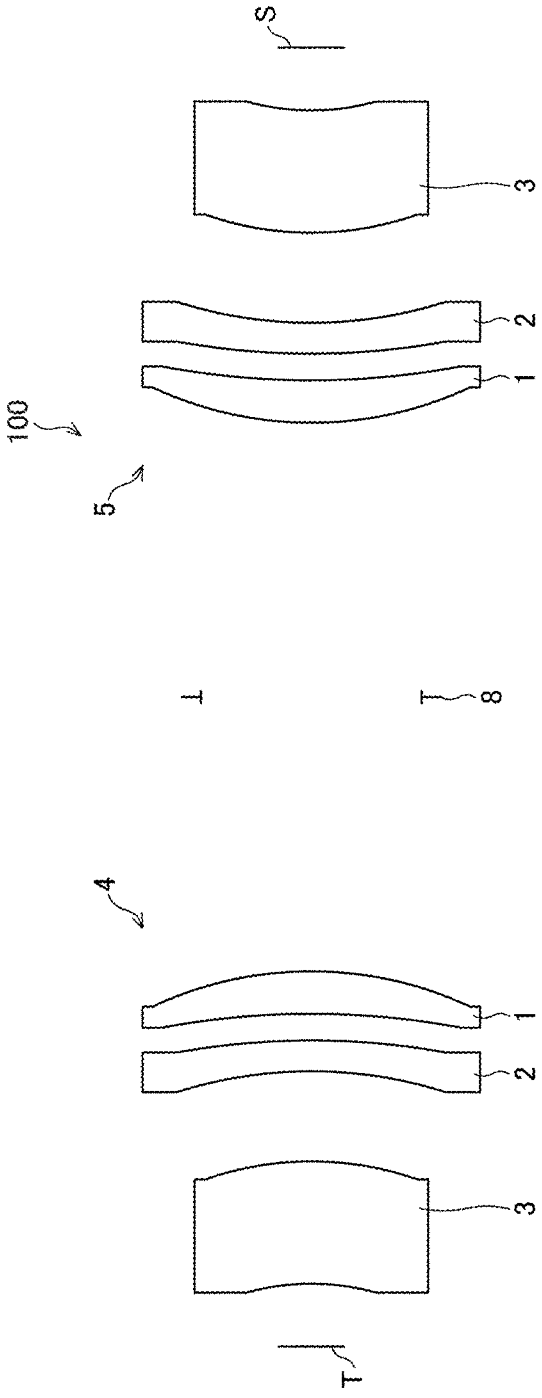
FIG. 1 is a cross-sectional view that illustrates a configuration of a main part of an optical system to which lens units in accordance with an embodiment are applied and that is along an optical axis.

FIG. 1 is a cross-sectional view that illustrates a configuration of a main part of an optical system 100 to which lens units in accordance with an embodiment are applied and that is along an optical axis. The optical system 100 is an optical system in which an image of an object plane T is formed on an image plane S on which an image sensor (detecting section) or the like that can be used in a wavelength range of an infrared region (7 μm to 14 μm) can be disposed. Note that the infrared region means a region of wavelengths from 7 μm to 14 μm, unless otherwise specified.

The optical system 100 includes (i) a first lens unit 4 and a second lens unit 5 which are lens units in accordance with an aspect of the present invention and (ii) a diaphragm 8. The first lens unit 4 is an objective lens, and collimates light that has entered the first lens unit 4 from an object plane T side. The first lens unit 4 is configured such that a first lens 1, a second lens 2, and a third lens 3 are disposed in order from a diaphragm 8 side toward the object plane T side.

The second lens unit 5 is an imaging lens that converges the collimated light on the image plane S, and has a configuration similar to that of the first lens unit 4. Specifically, the second lens unit 5 is configured such that a first lens 1, a second lens 2, and a third lens 3 are disposed in order from a diaphragm 8 side toward an image plane S side.

The second lens unit 5 has a configuration similar to that of the first lens unit 4. In the optical system 100, the second lens unit 5 is disposed so as to be symmetrical to the first lens unit 4 with respect to the diaphragm 8. The diaphragm for each of these lens units is located to a collimated light side of the first lens 1. In the optical system 100, the diaphragm 8 for each of the units is configured so as to be shared.

It is possible to apply the optical system 100 to a multi-spectral camera or a hyperspectral camera by, for example, disposing a filter or a phase shifter in a vicinity of the position of the diaphragm 8. Note that the optical system 100 does not need to include the diaphragm 8.

The optical system 100 has the lens units in accordance with an embodiment. Therefore, occurrence of a tilt error is easily suppressed. Thus, it is possible to suppress a decrease in modulation transfer function (MTF) which decrease is caused by occurrence of a tilt error, and possible to reduce the root mean square (RMS) radius of a concentrated spot on the image plane. Moreover, aberration is also suppressed. Furthermore, good resolution is achieved.

MTF of Optical System

The MTF in the wavelength range of 7 μm to 14 μm at a spatial frequency of 41.7 cycles/mm satisfies preferably not less than 0.35 and more preferably not less than 0.40 in an image circle. This configuration allows good resolution to be achieved on the image plane S. Note that the spatial frequency of 41.7 cycles/mm corresponds to a Nyquist frequency $f_N$ of an image sensor having a pixel pitch of 12 μm.

Lens Units

The lens units in accordance with an aspect of the present invention are described below. Since the second lens unit 5 has a configuration similar to that of the first lens unit 4, the first lens unit 4 is described, unless otherwise specified. Note that the first lens unit 4 may be referred to as "lens unit 4" and the second lens unit 5 may be referred to as "lens unit 5".

Figure 2:
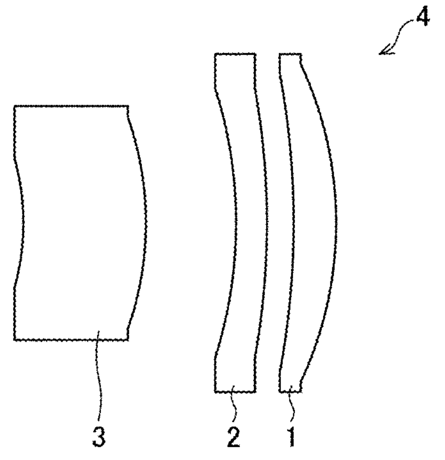
FIG. 2 is a cross-sectional view that illustrates a configuration of a main part of the lens unit in accordance with an embodiment and that is along the optical axis.
Figure 3:
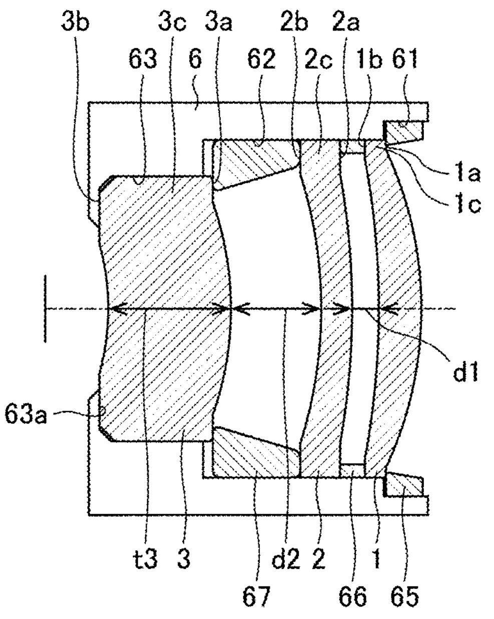
FIG. 3 is a cross-sectional view illustrating a state where the lens unit in accordance with an embodiment is accommodated and fixed in a lens barrel.
Figure 4:
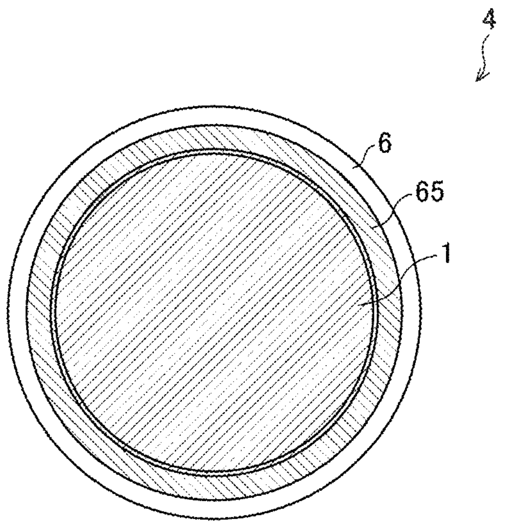
FIG. 4 is a front view illustrating the lens unit in accordance with an embodiment.

FIG. 2 is a cross-sectional view that illustrates a configuration of a main part of the lens unit in accordance with an embodiment and that is along the optical axis. FIG. 3 is a cross-sectional view illustrating a state where the lens unit 4 in accordance with an embodiment is accommodated and fixed in a lens barrel 6. FIG. 4 is a front view illustrating the lens unit 4 in accordance with an embodiment. The lens unit 4 includes the first lens 1, the second lens 2, the third lens 3, the lens barrel 6, a first ring part 65, a second ring part 66, and a third ring part 67.

Coating Film

A coating film is formed on a surface of each of the lenses (not illustrated). The coating film is formed for the purpose of (i) reducing reflection on the surface and thereby improving a transmittance, (ii) protecting the surface, etc. The coating film is preferably made of at least one selected from germanium (Ge), silicon (Si), fluorides, zinc selenide (ZnSe), zinc sulfide (ZnS), and diamond-like carbons.

The lens barrel 6 includes a first hole 61, a second hole 62, and a third hole 63. The first hole 61 is connected to the second hole 62, and has a diameter larger than that of the second hole 62. The second hole 62 is connected to the third hole 63, and has a diameter larger than that of the third hole 63. The third hole 63 has, on an aperture side, an edge part 63*a* that protrudes toward an axis.

The third lens 3 is fitted in the third hole 63. In the second hole 62, the third ring part 67, the second lens 2, the second ring part 66, and the first lens 1 are fitted in order from a third lens 3 side. Specifically, the second lens 2 is fitted in a state where the third ring part 67 intervenes between the second lens 2 and the third lens 3, and the first lens 1 is fitted in a state where the second ring part 66 intervenes between the first lens 1 and the second lens 2. The first ring part 65 that presses the first lens 1 is fitted in the first hole 61. The ring parts 65, 66, and 67 cause the lenses to be located at respective given positions in the lens barrel 6 or fix the lenses at respective given positions on the optical axis in the lens barrel 6. Specifically, the first ring part 65 presses a circumferential edge part (first surface 1*a*) of the first lens 1 which circumferential edge part (first surface 1*a*) is not in contact with the second ring part 66.

The lenses are fixed in a state where respective circumferential edge parts 1*c*, 2*c*, and 3*c* of the lenses are each in contact with the lens barrel 6 and/or at least one of the ring parts 65, 66, and 67. Each of the circumferential edge parts is a region that includes a flange part, and includes a corresponding one of first surfaces 1*a*, 2*a*, and 3*a*, a corresponding one of second surfaces 1*b*, 2*b*, and 3*b*, and a lens end surface. Each of the circumferential edge parts may include a portion of an optical surface. In the present embodiment, the third lens 3 is fixed in a state where the second surface 3*b* is locked by the edge part 63*a* of the lens barrel 6 and the first surface 3*a* is in contact with the third ring part 67. The second lens 2 is fixed in a state where the second surface 2*b* is in contact with the third ring part 67 and the first surface 2*a* is in contact with the second ring part 66. The first lens 1 is fixed in a state where the second surface 1*b* is in contact with the second ring part 66 and the first surface 1*a* is pressed by the first ring part 65. That is, each of the lenses of the lens unit 4 is accommodated and fixed in the lens barrel 6 by being pressed from a first lens 1 side by the first ring part 65.

The first surfaces and the second surfaces are each, for example, a region within 10 mm, a region within 8 mm, a region within 5 mm, a region within 3 mm, or a region within 2 mm, from the end surface (side surface) of a corresponding one of the lenses. A lower limit is, for example, not less than 0.5 mm, or not less than 1 mm.

Each of the circumferential edge parts 1*c*, 2*c*, and 3*c* has, on a portion which is in contact with the lens barrel 6 and/or at least one of the ring parts, a region in which the coating film is not attached (non-attachment region). For example, each of the circumferential edge parts 1*c*, 2*c*, and 3*c* has the non-attachment region on at least one of a corresponding one of the first surfaces 1*a*, 2*a*, and 3*a* and a corresponding one of the second surfaces 1*b*, 2*b*, and 3*b*.

Incidentally, in a case where a displacement, thickness nonuniformity, protrusion, etc. of a coating film occurs on a lens, the lens may be tilted with respect to the lens barrel 6 when the lens is accommodated and fixed in the lens barrel 6. In a case where such a tile occurs, a tilt error which results from the coating film may occur. In particular, in a lens unit of a finite-type spectral characteristic measurement device from which a measurement target is located at a short distance, a tilt error tends to greatly affects optical properties, as compared with a lens unit of an infinite-type spectral characteristic measurement device from which a subject is located at a long distance. In contrast, in the lens unit 4 in accordance with an aspect of the present invention, each of the circumferential edge parts has the non-attachment region in which the coating film is not attached. By bringing such a non-attachment region into direct contact with the lens barrel 6 and/or at least one of the ring parts, it is possible to suppress a tilt of each of the lenses which tilt results from the coating film. That is, in an aspect of the present invention, occurrence of a tilt error which results from the coating film is easily suppressed.

Each of the circumferential edge parts preferably has the non-attachment region on a lens surface which is in contact with (locked by) the lens barrel 6. In the present embodiment, the lens surface of the circumferential edge part which lens surface is locked by the lens barrel 6 is the second surface 3*b*. This makes it easy to suppress occurrence of a tilt error.

Each of the lenses particularly preferably has the non-attachment region on each of a corresponding one of the first surfaces 1*a*, 2*a*, and 3*a* and a corresponding one of the second surfaces 1*b*, 2*b*, and 3*b*. In this case, it becomes easy to effectively suppress occurrence of a tilt error.

The thickness of the coating film is preferably not less than 1 μm. As the thickness of the coating film becomes greater, a tilt error more easily occurs. Therefore, the above configuration makes it possible to effectively suppress occurrence of a tilt error. The thickness of the coating film is preferably not more than 5 μm.

The outer diameter of each of the lenses is preferably not less than 10 mm and not more than 100 mm. The lenses each of which has such an outer diameter easily bring about the effect of the present invention, because a tilt error tends to greatly affects optical properties. In a case where the outer diameter of each of the lenses is less than 10 mm, it is difficult to have the non-attachment region while ensuring an optical effective diameter. In a case where the outer diameter of each of the lenses is more than 100 mm, the effect of suppressing a tilt error by the non-attachment region becomes small.

It is preferable that each of the circumferential edge parts has the non-attachment region formed all around the each of the circumferential edge parts. Here, that "each of the circumferential edge parts has the non-attachment region formed all around the each of the circumferential edge parts" means that each of the circumferential edge parts has the non-attachment region continuously formed in the circumferential direction of the each of the circumferential edge parts. According to the above configuration, occurrence of a tilt error during mounting of each of the lenses is effectively suppressed.

The non-attachment region is a region that radially extends preferably not less than 1 mm, more preferably not less than 1.5 mm, from the end surface (side surface) of each of the lenses. By having the non-attachment region in the above region, it is possible to effectively suppress occurrence of a tilt error.

The flange part of each of the lenses has a width of preferably not less than 2 mm, more preferably not less than 5 mm in the lens radius direction. According to the above configuration, it becomes easy to fix each of the lenses to the lens barrel 6 and/or at least one of the ring parts, and occurrence of a tilt error during mounting is easily suppressed. An upper limit can be, for example, not more than 10 mm or not more than 9 mm.

Material of Lens Barrel

It is preferable that an aluminum alloy, for example, A5052 or A5056, be used as a material of the lens barrel 6. Such an aluminum alloy may be subjected to a satin treatment (treatment for making asperities). Further, the aluminum alloy may be used in a state of being black anodized. The material of the lens barrel 6 is not limited to the aluminum alloy. For example, the lens barrel 6 may be made of SUS304 (austenitic stainless steel), and black trivalent chromium plating may be applied to a surface layer.

Optical Axis Thicknesses of and Interval Between Lenses

In the present embodiment, the effective diameter of the first lens 1 is larger than the effective diameter of the third lens 3. The optical axis thickness t3 of the third lens 3 is greater than the optical axis thickness of each of the first lens 1 and the second lens 2. These configurations allow good resolution to be achieved in a case where the lens unit 4 is used as imaging lens.

The optical axis thickness t3 of the third lens 3 is preferably 0.5 times to 2 times a second distance d2 that is a distance on the optical axis between the second lens 2 and the third lens 3 (distance between respective surfaces of the second lens 2 and the third lens 3 which surfaces face each other). In this case, the optical system 100 has a high MTF in each of a tangential direction and a sagittal direction at the spatial frequency of 41.7 cycles/mm.

That is, the lens unit 4 has such good resolution as to be used for an image sensor that is for an infrared region and that has a pixel pitch substantially equal to a wavelength. That the MTF at the above-described spatial frequency is high means having such good resolution as to be used for an image sensor that has a narrow pitch substantially equal to a wavelength.

A first distance d1 that is a distance on the optical axis between the first lens 1 and the second lens 2 is preferably shorter than the second distance d2. In this case, a numerical aperture (NA) on an image side becomes higher, and it is possible to reduce the RMS radius of a concentrated spot on the image plane. The thickness of the third ring part 67 is preferably caused to be greater than the thickness of the second ring part 66. In this case, a tilt error is unlikely to occur when the lenses are assembled in the lens barrel 6.

The ratio of the second distance d2 to the first distance d1 is preferably not more than 9.

Materials of Lenses

Examples of a material of each of the lenses include germanium (Ge), silicon (Si), chalcogenide glass, zinc selenide (ZnSe), and zinc sulfide (ZnS). The chalcogenide glass contains 20% to 90% of tellurium (Te) by mol %, and preferably contains at least any one of 0% to 50% of germanium (Ge) and 0% to 50% of gallium (Ga). Note that the amount of the Te is preferably 30% to 88%, 40% to 84%, 50% to 82%, and particularly preferably 60% to 80%. Absorption of light by the chalcogenide glass is very little over a wide wavelength range of the infrared region, i.e., the wavelength range of 7 μm to 14 μm, and tends to have a good internal transmittance at least in the above wavelength range. An internal transmittance refers to a transmittance inside the material, and does not include a reflection loss on a surface of the material. Specifically, in a case of a thickness of 2 mm, the chalcogenide glass is capable of achieving an internal transmittance of not less than 90%, particularly not less than 95%, at a wavelength of 10 μm. Such chalcogenide glass was developed by the applicant of the present application (see PCT International Publication, No. WO2020/105719A1).

The Abbe number of the chalcogenide glass at a wavelength of 10 μm is preferably not less than 100 or not less than 150, and particularly preferably not less than 200. The Abbe number (ν10) is calculated by an expression below. Application of the chalcogenide glass having the above Abbe number makes it possible to suppress chromatic aberration.

ν10=(refractive index at wavelength of 10 μm−1)/(refractive index at wavelength of 8 μm−refractive index at wavelength of 12 μm)

The refractive index of the chalcogenide glass at a wavelength of 10 μm is preferably 2.5 to 4.0, 2.74 to 3.92, or 2.8 to 3.8, and particularly preferably 2.9 to 3.7. In a case where the refractive index is low, it is necessary to cause the radius of curvature of a lens to be smaller than that of a lens made of a material having a high refractive index. This is likely to result in an increase in the degree of difficulty in processing the lens. Furthermore, there is a possibility that an optical degree of freedom is impaired, e.g., the thickness in the direction of the optical axis becomes greater.

The chalcogenide glass preferably does not contain a toxic substance such as As, Se, or Tl. This makes it possible to reduce an environmental load.

The third lens 3 is preferably made of a material which has, at a wavelength of 10 μm, an internal transmittance that is equal to or higher than the internal transmittance of a material of which the second lens 2 is made and that is equal to or higher than the internal transmittance of a material of which the first lens 1 is made. The above configuration causes an image formed by the optical system 100 to have good resolution. For example, in a case of a thickness of 2 mm, the internal transmittance of the material of which the third lens 3 is made is preferably not less than 90% and particularly preferably not less than 95% at a wavelength of 10 μm. For example, the third lens 3 is preferably made of the above-described chalcogenide glass.

The third lens 3 is preferably made of the chalcogenide glass having a refractive index of 2.5 to 4.0 at a wavelength of 10 μm. The above configuration causes an image formed by the optical system 100 to have good resolution.

The second lens 2 is preferably made of the chalcogenide glass having a refractive index of 2.5 to 4.0 at a wavelength of 10 μm. The above configuration causes an image formed by the optical system 100 to have better resolution.

The first lens 1 is preferably made of germanium. In this case, the first lens 1 has good durability and good hardness.

Shapes of Lenses

Each of the lenses of the lens unit 4 preferably has the following configuration. The first lens 1 preferably has positive power and has a meniscus shape in which a second lens 2 side of the first lens 1 is concave. The second lens 2 preferably has negative power. The third lens 3 preferably has positive power and has a meniscus shape in which a second lens 2 side of the third lens 3 is convex. These configurations make it possible to cause the lens unit to be compact.

Diaphragm

The first lens 1 may have the diaphragm 8 that is located to a side of the first lens 1 which side is opposite from the second lens 2 in the direction of the optical axis (see FIG. 1). The ratio of the diameter of the diaphragm 8 to the effective diameter of an image is preferably 3 to 4.5. This configuration causes the NA on the image side to be high in a case where the lens unit 4 is an imaging lens (first lens unit 4). In a case where the lens unit 4 is an objective lens (second lens unit 5), an NA on an object plane side becomes high.

Shapes of Surfaces of Lenses

At least one surface of the first lens 1 is preferably a spherical surface. The first lens 1 is often disposed at a position at which misalignment easily occurs. Therefore, the above configuration makes it easy to suppress occurrence of a tilt error.

At least one optical surface of the second lens 2 or the third lens 3 is preferably an aspherical surface, or at least one surface of each of the second lens 2 and the third lens 3 is preferably an aspherical surface. Specifically, at least one of optical surfaces on a second surface **2*b* side and a second surface 3*b* side is preferably an aspherical surface. The optical surfaces on the second surface 2 side and the second surface 3 side are each located at a position at which misalignment is most unlikely to occur. Therefore, a tilt error is unlikely to occur. Furthermore, since each of the second surfaces 2*b* and 3*b* has the non-attachment region, a tilt error is more unlikely to occur. Thus, even in a case where at least one of these optical surfaces is an aspherical surface, a decrease in optical properties due to a tilt error is unlikely to occur. Note that optical surfaces on a first surface 2*a* side and a first surface 3*a*** side may be aspherical surfaces.

In a case where the second lens 2 has an aspherical surface, the aspherical surface may have a diffraction surface. In this case, chromatic aberration is easily reduced. A level difference between a concave and a convex of the diffraction surface is preferably 1 μm to 10 μm. In this case, chromatic aberration is more easily suppressed. Note that, in a case where the optical surface of the lens other than the second lens 2 is an aspherical surface, the aspherical surface may include a diffraction surface.

NA

In a case where the lens unit 4 is an imaging lens, the NA on the image side preferably satisfies not less than 0.4. The NA on the image side is directly connected to resolution. Therefore, the resolution of the optical system 100 is improved.

Modification of Lens Unit

Figure 5:
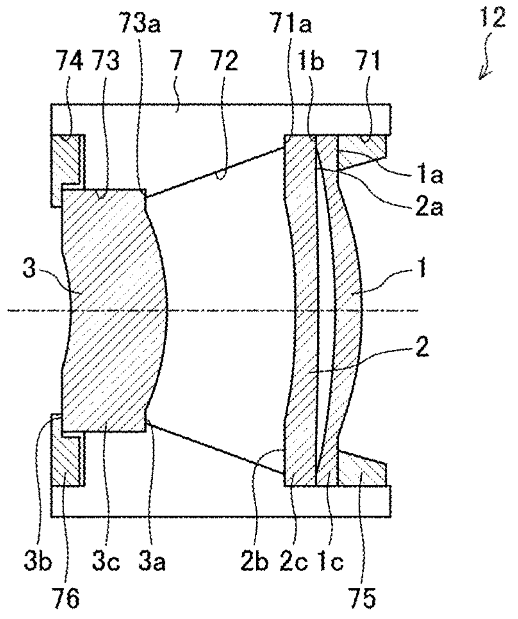
FIG. 5 is a cross-sectional view illustrating a state where a lens unit of a modification is accommodated and fixed in a lens barrel.

A lens unit 12 of a modification is described below. FIG. 5 is a cross-sectional view illustrating a state where the lens unit 12 of a modification is accommodated and fixed in a lens barrel 7. The lens unit 12 includes a first lens 1, a second lens 2, a third lens 3, the lens barrel 7, a first ring part 75, and a second ring part 76.

The lens barrel 7 includes a first hole 71, a second hole 72, a third hole 73, and a fourth hole 74. The first hole 71 is connected to the second hole 72, and has a diameter larger than that of the second hole 72. The first hole 71 has a locking part **71*a*. The second hole 72 is a tapered hole, and the first hole 71 and the third hole 73 are connected with the second hole 72 therebetween. The third hole 73 is connected to the fourth hole 74, and has a diameter smaller than that of the fourth hole 74. The third hole 73 has a locking part 73*a***.

The second ring part 76 is fitted in the fourth hole 74. The third lens 3 is fitted in the third hole 73. In the first hole 71, the second lens 2, the first lens 1, and the first ring part 75 are fitted in order from a third lens 3 side. The ring parts 75 and 76 cause the lenses to be located at respective given positions in the lens barrel 7 or fix the lenses at respective given positions on an optical axis in the lens barrel 7. Specifically, the first ring part 75 presses a circumferential edge part (first surface 1*a*) of the first lens 1 which circumferential edge part (first surface 1*a*) is not in contact with the second lens 2. The second ring part 76 presses a circumferential edge part (second surface 3*b*) of the third lens 3 which circumferential edge part (second surface 3*b*) is not in contact with the lens barrel 7.

The lenses are fixed in a state where respective circumferential edge parts 1*c*, 2*c*, and 3*c* of the lenses are each in contact with the lens barrel 7 and/or at least one of the ring parts 75 and 76. In the present modification, the third lens 3 is fixed in a state where the second surface 3*b* is pressed by the second ring part 76 and a first surface 3*a* is locked by the locking part 73*a*. The second lens 2 is fixed in a state where a second surface 2*b* is locked by the locking part 71*a* and a first surface 2*a* is in contact with the first lens 1. The first lens 1 is fixed in a state where a second surface 1*b* is in contact with the second lens 2 and the first surface 1*a* is pressed by the first ring part 75. That is, each of the lenses of the lens unit 12 is accommodated and fixed in the lens barrel 7 by being pressed from a first lens 1 side by the first ring part 75 and being pressed from a third lens 3 side by the second ring part 76.

Each of the circumferential edge parts of the lenses has a non-attachment region on a portion which is in contact with the lens barrel 7 and/or at least one of the ring parts. Specifically, each of the lenses has the non-attachment region on at least one of a corresponding one of the first surfaces 1*a*, 2*a*, and 3*a* and a corresponding one of the second surfaces 1*b*, 2*b*, and 3*b*.

Also in the present modification, each of the lenses has the non-attachment region in which a coating film is not attached. By bringing such a non-attachment region into direct contact with the lens barrel 7 and/or at least one of the ring parts, it is possible to suppress a tilt of each of the lenses which tilt results from the coating film. That is, in the present modification, occurrence of a tilt error which results from the coating film is easily suppressed.

Also in the present modification, at least circumferential edge parts of lens surfaces (pressed surfaces) each of which is locked by the lens barrel 7 each preferably have the non-attachment region, and all of the pressed surfaces each more preferably have the non-attachment region. In the present modification, the circumferential edge parts of the lens surfaces each of which is locked by the lens barrel 7 are the first surface 3*a* and the second surface 2*b*. This makes it easy to suppress occurrence of a tilt error.

Each of the lenses particularly preferably has the non-attachment region on each of a corresponding one of the first surfaces 1*a*, 2*a*, and 3*a* and a corresponding one of the second surfaces 1*b*, 2*b*, and 3*b*. In this case, it becomes easy to effectively suppress occurrence of a tilt error.

An optical surface on a side on which the surface having the non-attachment region is located may be an aspherical surface. As stated above, by having the non-attachment region, occurrence of a tilt error is suppressed. Therefore, even in a case where the optical surface is an aspherical surface, it is possible to suppress a decrease in MTF which decrease results from occurrence of a tilt error, and possible to reduce the RMS radius of a concentrated spot on an image plane.

Spectral Characteristic Device

Figure 6:
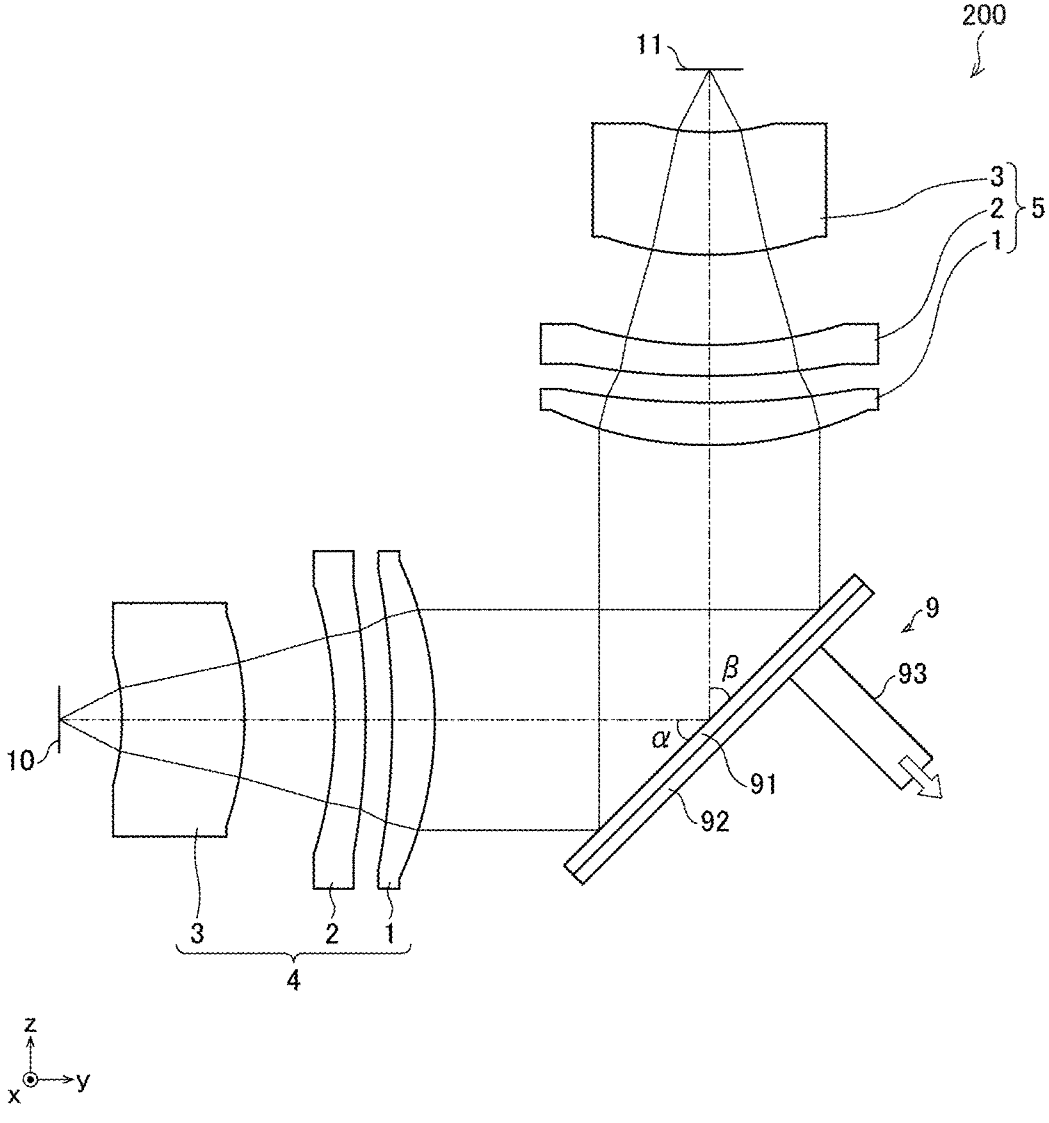
FIG. 6 is a cross-sectional view illustrating a spectral characteristic measurement device to which lens units in accordance with an embodiment are applied.

FIG. 6 is a cross-sectional view illustrating a spectral characteristic measurement device 200 to which lens units in accordance with an embodiment are applied. The spectral characteristic measurement device 200 includes a lens unit 4, a lens unit 5, a sample support plate 10, a detecting section 11, and a phase shifter 9. The configurations of the lens unit 4 and the lens unit 5 of the spectral characteristic measurement device 200 are similar to those of the lens unit 4 and the lens unit 5 of the optical system 100.

In the spectral characteristic measurement device 200, a third lens 3 of the lens unit 4 is disposed so as to face the sample support plate 10, and a third lens 3 of the lens unit 5 is disposed so as to face the detecting section 11. The phase shifter 9 is disposed between the lens unit 4 and the lens unit 5. The optical axis of the lens unit 4 and the optical axis of the lens unit 5 are perpendicular to each other in the phase shifter 9. In the spectral characteristic measurement device 200, the optical axis is bent perpendicularly in the phase shifter 9 of a reflection type. However, a basic optical configuration is the same as that of the above-described optical system 100 of a transmission type. The phase shifter 9 is disposed in a vicinity of the position of a diaphragm 8 of the optical system 100. That is, the lens unit 4 and the lens unit 5 are disposed symmetrically with respect to the phase shifter 9.

In the present embodiment, the spectral characteristic measurement device 200 employs the phase shifter 9 of a reflection type. The phase shifter 9 includes a fixed mirror section 91, a movable mirror section 92, and a driving section 93. The fixed mirror section 91 and the movable mirror section 92 are disposed so as to be arranged in the direction perpendicular to the drawing surface of FIG. 6 (direction of an x axis) in a state where the movable mirror section 92 is located on a far side of the direction of the x axis with respect to the fixed mirror section 91. The fixed mirror section 91 and the movable mirror section 92 are disposed so as to be tilted $\alpha$ degrees (approximately 45 degrees) with respect to the optical axis of the lens unit 4. The fixed mirror section 91 and the movable mirror section 92 are disposed so as to be tilted $\beta$ degrees (approximately 45 degrees) with respect to the optical axis of the lens unit 5. The movable mirror section 92 is configured such that the movable mirror section 92 can be moved in the direction perpendicular to a surface of the movable mirror section 92. This causes a phase difference between a first light beam that has been reflected by the fixed mirror section 91 and a second light beam that has been reflected by the movable mirror section 92. Note that the phase shifter 9 is not limited the reflection type, and may be of a transmission type.

Infrared light is emitted from a light source (not illustrated) toward a sample (not illustrated) in a state where the sample is supported on the sample support plate 10. The infrared light is scattered by various components of the sample, and the scattered light enters the third lens 3 of the lens unit 4. The scattered light is caused to be a collimated light beam by the lens unit 4. The collimated light beam reaches the fixed mirror section 91 and the movable mirror section 92 of the phase shifter 9. A part of the light is reflected by the fixed mirror section 91, and enters a first lens 1 of the lens unit 5 as a first light beam. The remaining part of the light is reflected by the movable mirror section 92, and enters the first lens 1 of the lens unit 5 as a second light beam. The first light beam and the second light beam that have entered the lens unit 5 cause an image to be formed on a light receiving surface of the detecting section 11, so that an interferogram (synthetic waveform spectrum of a change in imaging intensity (change in intensity of interference light)) is formed.

In a case where a phase difference is caused between the first light beam and the second light beam by moving the movable mirror section 92, a waveform of an interferogram is obtained. By Fourier transform of the interferogram, a spectral characteristic of the sample is obtained. The spectral characteristic measurement device 200 includes lens units of an aspect of the present invention. Therefore, it is possible to suppress a tilt error during mounting of lenses. Furthermore, an image formed in the detecting section 11 has good resolution. This makes it possible to obtain a spectral characteristic of a sample.

Recap

A lens unit in accordance with a first aspect of the present invention is a lens unit which is used for an infrared region that includes at least any one of wavelengths in a range of 7 μm to 14 μm, the lens unit including: at least one lens that has a surface on which a coating film is formed; a lens barrel that has a hole in which the at least one lens is fitted; and a ring part that is a member which is in contact with a circumferential edge part of the at least one lens and which is for causing the at least one lens fitted in the hole to be located at a given position on an optical axis of the lens barrel or fixing, at a given position on the optical axis of the lens barrel, the at least one lens fitted in the hole, wherein the circumferential edge part of the at least one lens has, on a portion which is in contact with at least any one of the lens barrel and the ring part, a region in which the coating film is not attached. According to the above configuration, occurrence of a tilt error which results from the coating film is suppressed.

The lens unit in accordance with a second aspect of the present invention is arranged such that, in the first aspect, a thickness of the coating film is not less than 1 μm. In a case where the thickness of the coating film is not less than 1 μm, a tilt error easily occurs due to the coating film. Therefore, the above configuration in which the region in which the coating film is not attached is provided to the lens, occurrence of a tilt error is effectively suppressed.

The lens unit in accordance with a third aspect of the present invention is arranged such that, in the first or second aspect, the coating film is made of at least one selected from Ge, Si, fluorides, ZnSe, ZnS, and diamond-like carbons.

The lens unit in accordance with a fourth aspect of the present invention is arranged such that, in any one of the first through third aspects, an outer diameter of the at least one lens is not less than 10 mm and not more than 100 mm. The lens having such an outer diameter easily brings about the effect of the present invention by the above configuration, because a tilt error that results from a coating tends to greatly affects optical properties.

The lens unit in accordance with a fifth aspect of the present invention is arranged such that, in any one of the first through fourth aspects, the circumferential edge part has, on a lens surface which is in contact with the lens barrel, the region in which the coating film is not attached. The above configuration makes it easy to suppress occurrence of a tilt error.

The lens unit in accordance with a sixth aspect of the present invention is arranged such that, in any one of the first through fifth aspects, the circumferential edge part of the at least one lens has, all around the circumferential edge part, the region in which the coating film is not attached. According to the above configuration, occurrence of a tilt error during mounting of each of the lenses is effectively suppressed.

The lens unit in accordance with a seventh aspect of the present invention is arranged such that, in any one of the first through sixth aspects, the coating film is not attached to a region that radially extends not less than 1 mm from an end surface of the at least one lens. An end surface side of the circumferential edge part easily moves during mounting. Thus, by the above configuration, occurrence of a tilt error is effectively suppressed.

The lens unit in accordance with an eighth aspect of the present invention is arranged such that, in any one of the first through seventh aspects, the at least one lens includes a first lens, a second lens, and a third lens; the first lens, the second lens, and the third lens are accommodated and fixed in order in the lens barrel; an effective diameter of the first lens is larger than an effective diameter of the third lens; and an optical axis thickness of the third lens is greater than an optical axis thickness of each of the first lens and the second lens. According to the above configuration, it is possible to suppress a tilt error during mounting of the lens. Furthermore, an image formed in a detecting section has good resolution. This makes it possible to obtain a spectral characteristic of a sample.

The lens unit in accordance with a ninth aspect of the present invention is arranged such that, in the eighth aspect, the optical axis thickness of the third lens is 0.5 times to 2 times a second distance which is a distance on the optical axis between the second lens and the third lens. According to the above configuration, an NA on an image side becomes high, and it is possible to reduce the RMS radius of a concentrated spot. Moreover, it is possible to reduce chromatic aberration.

The lens unit in accordance with a tenth aspect of the present invention is arranged such that, in the eighth or ninth aspect, a first distance which is a distance on the optical axis between the first lens and the second lens is shorter than a second distance which is a distance on the optical axis between the second lens and the third lens. According to the above configuration, the NA on the image side becomes high, and it is possible to reduce the RMS radius of a concentrated spot.

The lens unit in accordance with an eleventh aspect of the present invention is arranged such that, in any one of the eighth through tenth aspects, the lens barrel has a first hole, a second hole, and a third hole as the hole; the lens unit has a first ring part, a second ring part, and a third ring part as the ring part; the third lens is fitted in the third hole; the second hole is connected to the third hole, the second hole has a diameter larger than a diameter of the third hole, the second lens is fitted in the second hole in a state where the third ring part intervenes between the second lens and the third lens, and the first lens is fitted in the second hole in a state where the second ring part intervenes between the first lens and the second lens; the first hole is connected to the second hole, the first hole has a diameter larger than the diameter of the second hole, and the first ring part which presses a circumferential edge part of a surface of the first lens which surface is not in contact with the second ring part is fitted in the first hole; and at least a circumferential edge part of a surface of the third lens which surface is not in contact with the third ring part, a circumferential edge part of a surface of the second lens which surface is in contact with the third ring part, and a circumferential edge part of a surface of the first lens which surface is in contact with the second ring part each have the region in which the coating film is not attached. According to the above configuration, it is possible to reduce occurrence of a tilt error during mounting.

The lens unit in accordance with a twelfth aspect of the present invention is arranged such that, in any one of the eighth through tenth aspects, the lens barrel has a first hole, a second hole, a third hole, and a fourth hole as the hole; the lens unit has a first ring part and a second ring part as the ring part; the first hole and the third hole each have a locking part which locks the circumferential edge part of the at least one lens; the fourth hole is connected to the third hole, the fourth hole has a diameter larger than a diameter of the third hole, and the second ring part which presses the third lens in a state where a circumferential edge part of the third lens is locked by the locking part is fitted in the fourth hole; the first hole and the third hole are connected with the second hole therebetween; the first hole is connected to the second hole, the first hole has a diameter larger than a diameter of the second hole, and the second lens, the first lens, and the first ring part are fitted in the first hole in order from a second hole side; and at least the circumferential edge part of the third lens which circumferential edge part is in contact with the locking part and a circumferential edge part of a surface of the second lens which surface is not in contact with the first lens has the region in which the coating film is not attached. According to the above configuration, it is possible to reduce occurrence of a tilt error during mounting.

The lens unit in accordance with a thirteenth aspect of the present invention is arranged such that, in any one of the eighth through twelfth aspects, the third lens is made of chalcogenide glass which has a refractive index of 2.5 to 4.0 at a wavelength of 10 μm. According to the above configuration, the third lens has a high transmittance.

The lens unit in accordance with a fourteenth aspect of the present invention is arranged such that, in the thirteenth aspect, the chalcogenide glass contains 20% to 80% of Te by mol %.

Supplementary Note

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1 First lens
2 Second lens
3 Third lens
1*a*, 2*a*, 3*a* First surface
1*b*, 2*b*, 3*b* Second surface
1*c*, 2*c*, 3*c* Circumferential edge part
4 First lens unit
5 Second lens unit
6, 7 Lens barrel
61, 71 First hole
62, 72 Second hole
63, 73 Third hole
63*a* Edge part
74 Fourth hole
65, 75 First ring part
66, 76 Second ring part
67 Third ring part
71*a*, 73*a* Locking part
8 Diaphragm
9 Phase shifter
91 Fixed mirror section
92 Movable mirror section
93 Driving section
10 Sample support plate
11 Detecting section
12 Lens unit
100 Optical system
200 Spectral characteristic measurement device
S Image plane
T Object plane
d1 First distance
d2 Second distance
t3 Optical axis thickness of third lens

The invention claimed is:

1. A lens unit which is used for an infrared region that includes at least any one of wavelengths in a range of 7 μm to 14 μm, said lens unit comprising:
- at least one lens that has a surface on which a coating film is formed;
- a lens barrel that has a hole in which the at least one lens is fitted; and
- a ring part that is a member which is in contact with a circumferential edge part of the at least one lens and which is for causing the at least one lens fitted in the hole to be located at a given position on an optical axis of the lens barrel or fixing, at a given position on the optical axis of the lens barrel, the at least one lens fitted in the hole, wherein
- the circumferential edge part of the at least one lens has, on a portion which is in contact with at least any one of the lens barrel and the ring part, a region in which the coating film is not attached, wherein:
- the at least one lens includes a first lens, a second lens, and a third lens;
- the first lens, the second lens, and the third lens are accommodated and fixed in order in the lens barrel;
- an effective diameter of the first lens is larger than an effective diameter of the third lens; and
- an optical axis thickness of the third lens is greater than an optical axis thickness of each of the first lens and the second lens, and
- wherein a first distance which is a distance on the optical axis between the first lens and the second lens is shorter than a second distance which is a distance on the optical axis between the second lens and the third lens.

2. The lens unit as set forth in claim 1, wherein a thickness of the coating film is not less than 1 μm.

3. The lens unit as set forth in claim 1, wherein the coating film is made of at least one selected from Ge, Si, fluorides, ZnSe, ZnS, and diamond-like carbons.

4. The lens unit as set forth in claim 1, wherein an outer diameter of the at least one lens is not less than 10 mm and not more than 100 mm.

5. The lens unit as set forth in claim 1, wherein the circumferential edge part has, on a lens surface which is in contact with the lens barrel, the region in which the coating film is not attached.

6. The lens unit as set forth in claim 1, wherein the circumferential edge part of the at least one lens has, all around the circumferential edge part, the region in which the coating film is not attached.

7. The lens unit as set forth in claim 1, wherein the coating film is not attached to a region that radially extends not less than 1 mm from an end surface of the at least one lens.

8. The lens unit as set forth in claim 1, wherein:

the lens barrel has a first hole, a second hole, and a third hole as the hole;

the lens unit has a first ring part, a second ring part, and a third ring part as the ring part;

the third lens is fitted in the third hole;

the second hole is connected to the third hole, the second hole has a diameter larger than a diameter of the third hole, the second lens is fitted in the second hole in a state where the third ring part intervenes between the second lens and the third lens, and the first lens is fitted in the second hole in a state where the second ring part intervenes between the first lens and the second lens;

the first hole is connected to the second hole, the first hole has a diameter larger than the diameter of the second hole, and the first ring part which presses a circumferential edge part of a surface of the first lens which is not in contact with the second ring part is fitted in the first hole; and at least a circumferential edge part of a surface of the third lens which is not in contact with the third ring part, a circumferential edge part of a surface of the second lens which is in contact with the third ring part, and a circumferential edge part of a surface of the first lens which is in contact with the second ring part each have the region in which the coating film is not attached.

9. The lens unit as set forth in claim 1, wherein the third lens is made of chalcogenide glass which has a refractive index of 2.5 to 4.0 at a wavelength of 10 μm.

10. The lens unit as set forth in claim 9, wherein the chalcogenide glass contains 20% to 80% of Te by mol %.

11. A lens unit which is used for an infrared region that includes at least any one of wavelengths in a range of 7 μm to 14 μm, said lens unit comprising:

at least one lens that has a surface on which a coating film is formed;

a lens barrel that has a hole in which the at least one lens is fitted; and a ring part that is a member which is in contact with a circumferential edge part of the at least one lens and which is for causing the at least one lens fitted in the hole to be located at a given position on an optical axis of the lens barrel or fixing, at a given position on the optical axis of the lens barrel, the at least one lens fitted in the hole, wherein:

the at least one lens includes a first lens, a second lens, and a third lens;

the first lens, the second lens, and the third lens are accommodated and fixed in order in the lens barrel;

an effective diameter of the first lens is larger than an effective diameter of the third lens; and an optical axis thickness of the third lens is greater than an optical axis thickness of each of the first lens and the second lens, and wherein the circumferential edge part of the at least one lens has, on a portion which is in contact with at least any one of the lens barrel and the ring part, a region in which the coating film is not attached, wherein the optical axis thickness of the third lens is 0.5 times to 2 times a second distance which is a distance on the optical axis between the second lens and the third lens.

12. A lens unit which is used for an infrared region that includes at least any one of wavelengths in a range of 7 μm to 14 μm, said lens unit comprising:

at least one lens that has a surface on which a coating film is formed;

a lens barrel that has a hole in which the at least one lens is fitted; and a ring part that is a member which is in contact with a circumferential edge part of the at least one lens and which is for causing the at least one lens fitted in the hole to be located at a given position on an optical axis of the lens barrel or fixing, at a given position on the optical axis of the lens barrel, the at least one lens fitted in the hole, wherein the circumferential edge part of the at least one lens has, on a portion which is in contact with at least any one of the lens barrel and the ring part, a region in which the coating film is not attached, wherein:

the at least one lens includes a first lens, a second lens, and a third lens;

the first lens, the second lens, and the third lens are accommodated and fixed in order in the lens barrel;

an effective diameter of the first lens is larger than an effective diameter of the third lens; and an optical axis thickness of the third lens is greater than an optical axis thickness of each of the first lens and the second lens, wherein:

the lens barrel has a first hole, a second hole, a third hole, and a fourth hole as the hole;

the lens unit has a first ring part and a second ring part as the ring part;

the first hole and the third hole each have a locking part which locks a circumferential edge part of a corresponding one of the second lens and the third lens;

the fourth hole is connected to the third hole, the fourth hole has a diameter larger than a diameter of the third hole, and the second ring part which presses the third lens in a state where the circumferential edge part of the third lens is locked by the locking part is fitted in the fourth hole;

the first hole and the third hole are connected with the second hole therebetween;

the first hole is connected to the second hole, the first hole has a diameter larger than a diameter of the second hole, and the second lens, the first lens, and the first ring part are fitted in the first hole in order from a second hole side; and at least the circumferential edge part of the third lens which is in contact with the locking part and a circumferential edge part of a surface of the second lens which is not in contact with the first lens has the region in which the coating film is not attached.

* * * * *